US011885561B2

(12) United States Patent
Davies et al.

(10) Patent No.: US 11,885,561 B2
(45) Date of Patent: Jan. 30, 2024

(54) LOW GLOBAL-WARMING REFRIGERANTS IN LNG PROCESSING

(71) Applicants: Paul Davies, Richmond, TX (US);
James Lee Harris, Jr., Katy, TX (US);
Emery Jay Thomas, Sugar Land, TX (US); Gregg Sapp, Houston, TX (US)

(72) Inventors: Paul Davies, Richmond, TX (US);
James Lee Harris, Jr., Katy, TX (US);
Emery Jay Thomas, Sugar Land, TX (US); Gregg Sapp, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 1303 days.

(21) Appl. No.: 14/085,372

(22) Filed: Nov. 20, 2013

(65) Prior Publication Data

US 2014/0150491 A1 Jun. 5, 2014

Related U.S. Application Data

(60) Provisional application No. 61/733,293, filed on Dec. 4, 2012.

(51) Int. Cl.
*F25J 1/00* (2006.01)
*F25J 1/02* (2006.01)
*C09K 5/04* (2006.01)

(52) U.S. Cl.
CPC .............. *F25J 1/0022* (2013.01); *C09K 5/042* (2013.01); *C09K 5/045* (2013.01); *F25J 1/0062* (2013.01); *F25J 1/0097* (2013.01); *F25J 1/0256* (2013.01); *F25J 1/0278* (2013.01); *C09K 2205/126* (2013.01)

(58) Field of Classification Search
CPC ... F25J 1/0022; F25J 1/0211; F25J 1/02; F25J 1/0052; F25J 1/0217; F25J 1/0218; F25J 1/0278; F25J 1/0297; F25J 1/0292; C09K 5/042; C09K 5/045; C09K 2205/22; C09K 2205/12
See application file for complete search history.

(56) References Cited

U.S. PATENT DOCUMENTS

| 6,269,655 B1 * | 8/2001 | Roberts | F25J 1/0291 62/612 |
| 6,438,994 B1 | 8/2002 | Rashad et al. | |
| 6,742,357 B1 * | 6/2004 | Roberts | C09K 5/042 62/612 |
| 7,293,421 B2 * | 11/2007 | Michalski | F25B 17/086 62/101 |
| 7,849,691 B2 | 12/2010 | Faulkner et al. | |

(Continued)

OTHER PUBLICATIONS

International Search Report, PCT/US2013/071032, dated Mar. 18, 2014.

*Primary Examiner* — Frantz F Jules
*Assistant Examiner* — Webeshet Mengesha
(74) *Attorney, Agent, or Firm* — Boulware & Valoir, PLLC

(57) ABSTRACT

Methods and systems for liquefying natural gas using environmentally-friendly low combustibility refrigerants are provided. Methods of liquefaction include cooling a fluid in an LNG facility via indirect heat exchange with an environmentally-friendly low combustibility refrigerant selected from the group consisting of: a fluorinated olefin, xenon, any derivative thereof, and any combination thereof.

9 Claims, 2 Drawing Sheets

(56) References Cited

U.S. PATENT DOCUMENTS

| | | | |
|---|---|---|---|
| 2003/0149428 A1 | 8/2003 | Ryba | |
| 2006/0243945 A1* | 11/2006 | Minor | C08J 9/149 |
| | | | 252/67 |
| 2008/0078177 A1 | 4/2008 | Faulkner | |
| 2008/0141711 A1 | 6/2008 | Roberts et al. | |
| 2008/0230738 A1* | 9/2008 | Minor | A62D 1/0057 |
| | | | 252/67 |
| 2009/0277217 A1* | 11/2009 | Ransbarger | F25J 1/023 |
| | | | 62/612 |
| 2009/0314015 A1* | 12/2009 | Minor | C09K 5/045 |
| | | | 62/115 |
| 2010/0122551 A1 | 5/2010 | Roberts et al. | |
| 2010/0127208 A1 | 5/2010 | Nappa et al. | |
| 2010/0154419 A1* | 6/2010 | Kontomaris | F01K 23/064 |
| | | | 60/645 |
| 2010/0281915 A1* | 11/2010 | Roberts | C09K 5/041 |
| | | | 62/612 |
| 2010/0282999 A1* | 11/2010 | Shimomura | C10M 171/008 |
| | | | 252/67 |
| 2011/0031436 A1* | 2/2011 | Mahler | C07C 17/087 |
| | | | 252/78.1 |
| 2011/0253927 A1 | 10/2011 | Minor et al. | |
| 2012/0305480 A1 | 12/2012 | Low | |
| 2013/0325732 A1 | 12/2013 | Low | |
| 2015/0013379 A1* | 1/2015 | Oelfke | F25J 1/0022 |
| | | | 62/612 |

\* cited by examiner

LOW GLOBAL-WARMING REFRIGERANTS IN LNG PROCESSING

CROSS-REFERENCE TO RELATED APPLICATIONS

This application is a non-provisional application which claims priority to and benefit under 35 USC § 119(e) to U.S. Provisional Application Ser. No. 61/733,293 filed Dec. 4, 2012, entitled "Use of Low Global-Warming Potential, Low Ozone Depletion Potential, Low Combustibility Hydrofluoro-Olefin Refrigerants in LNG Processing," which is incorporated herein in its entirety.

FIELD OF THE INVENTION

The present invention relates generally to methods for liquefying natural gas. More particularly, but not by way of limitation, embodiments of the present invention include methods and systems for liquefying natural gas using environmentally-friendly low combustibility refrigerants.

BACKGROUND OF THE INVENTION

Natural gas is an important resource widely used as energy source or as industrial feedstock used in, for example, manufacture of plastics. Comprising primarily of methane, natural gas is a mixture of naturally occurring hydrocarbon gases and is typically found in deep underground natural rock formations or other hydrocarbon reservoirs. Other components of natural gas may include, but are not limited to, ethane, propane, carbon dioxide, nitrogen, and hydrogen sulfide. Typically, natural gas is transported from source to consumers through pipelines that physically connect reservoir to market.

Because natural gas is sometimes found in remote areas devoid of certain infrastructure (e.g., pipelines), alternative methods for transporting natural gas must be used. This situation commonly arises when the source of natural gas and the market are separated by great distances, for example, a large body of water. Bringing this natural gas from remote areas to market can have significant commercial value if the cost of transporting natural gas is minimized.

One alternative method of transporting natural gas involves converting natural gas into a liquefied form via liquefaction process. Because natural gas is gaseous under standard atmospheric conditions, it is typically subjected to thermodynamic processes in order to be liquefied. In its liquefied form, natural gas has a specific volume that is significantly lower than its specific volume in its gaseous form. Thus, the liquefaction process greatly increases the ease of transporting and storing natural gas, particularly in cases where pipelines are not available. For example, ocean liners carrying liquefied natural gas tanks can effectively link a natural gas source to a distant market when separated by an ocean.

Converting natural gas to its liquefied form can have other economic benefits as well. For example, storing liquefied natural gas (LNG) can help balance out periodic fluctuations in natural gas supply and demand. In particular, LNG can be more easily "stockpiled" for later use when natural gas demand is low and/or supply is high. As a result, future demand peaks can be met with LNG from storage, which can be vaporized as demand requires.

At least several conventional methods exist for liquefying natural gas. In one method, a propane pre-cooled mixed refrigerant is used to cool natural gas. The mixed refrigerant typically includes, but is not limited to, nitrogen, methane, ethane, and propane. In another method (e.g., optimized cascade process), natural gas is converted into LNG by utilizing multiple refrigerants in one or more mechanical refrigeration cycles that are used to lower the temperature of a natural gas stream. During the optimized cascade process, natural gas is first treated to remove contaminants including, but not limited to, $CO_2$, water, and mercury before entering the liquefaction section of an LNG plant. The treated gas is then chilled to approximately −260° F. in successively colder heat exchangers that use propane, ethylene, and methane as refrigerants. In some cases, the refrigerants are pure or substantially pure substances. In other cases, the refrigerants can be mixtures comprising more than one component. The product leaving the methane exchangers is LNG that is ready for storage. The LNG product is then pumped into insulated storage tanks before being loaded on special ships to be transported to LNG import terminals around the world.

While LNG and LNG facilities are generally considered safe, there are certain inherent safety risks associated with hydrocarbon processing techniques. For example, conventional LNG refrigerants such as propane and ethylene are flammable materials. One potential catastrophic outcome arising from an accidental release of flammable materials is a vapor cloud explosion. Vapor cloud explosion can start when the released flammable material forms a vapor cloud within a congested or confined area. Ignition of this cloud produces a flame front that accelerates through the congestion and creates a pressure wave. The severity of the pressure wave depends on several factors including, but not limited to, type of fuel released, size of the cloud within the congested/confined area, and degree of congestion/confinement within the cloud. As processing plants become more congested and confined, risk of explosion can increases. Most vapor cloud explosions have subsonic flame speeds and are classified as deflagrations. Even short-duration deflagrations can result in significant damage to buildings, equipments, and people. Potential damage is primarily a function of total amount of fuel burned, the maximum flame velocity that is achieved, and the manner in which the expansion of the combustion gases is contained.

Typically, LNG facilities are built in sufficiently open spaces in order to reduce the chances of a vapor cloud explosion in the unlikely case that flammable material is released. Other design considerations can also reduce the risk of explosion.

Recent expansion of LNG technology for offshore developments have prompted new studies analyzing safety risks of offshore LNG facilities. While these studies generally demonstrate that offshore LNG technology does not present unsafe risk levels, additional risk reduction efforts should always be considered. Moreover, as regulations become increasingly more strict, other traditional chlorofluorocarbon (CFC), hydrofluororcarbon (HFC) and perfluororcarbon (PFC) materials used as LNG refrigerants may be required to meet higher environmental standards.

BRIEF SUMMARY OF THE DISCLOSURE

The present invention relates generally to methods for liquefying natural gas. More particularly, but not by way of limitation, embodiments of the present invention include methods and systems for liquefying natural gas using environmentally-friendly low combustibility refrigerants.

One example of a method for liquefying natural gas comprises the steps of: cooling a fluid in an LNG facility via indirect heat exchange with an environmentally-friendly refrigerant selected from the group consisting of: a fluorinated olefin, any derivative thereof, and any combination thereof.

Another example of a method for liquefying natural gas comprises the steps of: cooling a fluid in an LNG facility via indirect heat exchange with a refrigerant mixture comprising: a fluorinated olefin thereof and a paraffinic fluorocarbon.

In other embodiments, the environmentally-friendly low combustibility refrigerant, such as Xenon or any mixture of Xenon and a fluorocarbon or hydrocarbon refrigerant with iodine (several embodiments of this idea exist either by using Xenon as a pure refrigerant or mixing Xenon with various hydrocarbon, fluorocarbon, iodine substituted fluorohydrocarbons, or fluorolefin refrigerant mixtures) may be used in place of ethylene.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Figure 1:
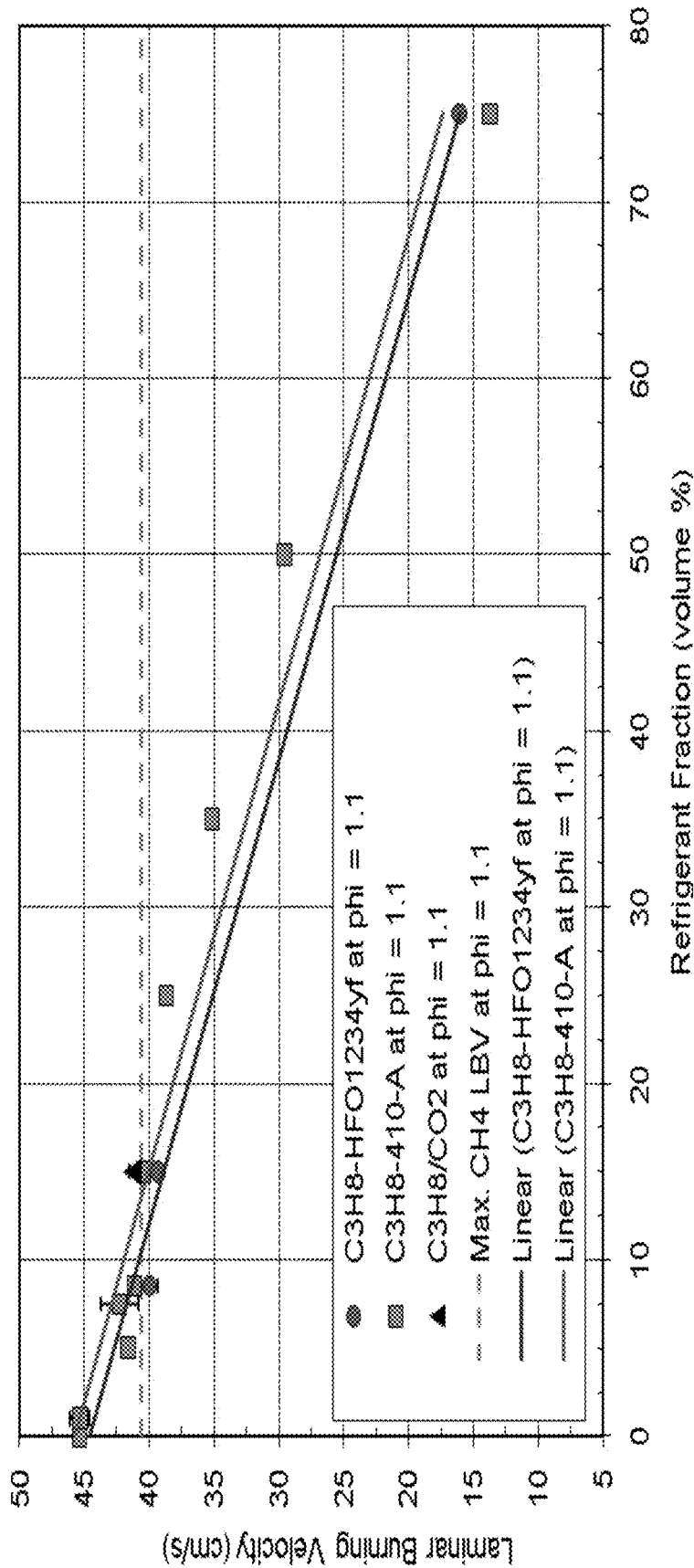
FIG. 1 is a plot summarizing effects of environmentally-friendly refrigerants on laminar burning velocity as described in Example 1.

The present invention relates generally to methods for liquefying natural gas. More particularly, but not by way of limitation, embodiments of the present invention include methods and systems for liquefying natural gas using environmentally-friendly low combustibility refrigerants.

There are certain inherent safety risks related to transporting and processing of LNG. These include, but are not limited to, hydrocarbon and LNG process and tanks, helicopter transportation, occupational, and ship collision. Certain risk evaluations indicate the general risk perspective that hydrocarbon (including LNG) processing and tanks can contribute to ~25-50% of the overall risk to personnel engaged in a large LNG operation. As most refrigerants used in large LNG operations are flammable, they can contribute to the overall safety risk to personnel. It is believed that the portion of risk attributed to flammable refrigerants can be on the order of 2-5%. In addition to the personnel risk, potential impacts of an explosion arising from the use of flammable refrigerants include damage and/or loss of facility assets and major business interruption. While current use of flammable refrigerants are generally considered safe in the context of overall risk, there may be safer alternative refrigerants that can reduce inherent risks to personnel.

Various parameters can lessen or heighten the risk of a vapor cloud explosion. Some of the parameters affecting the risk of vapor cloud explosions include, but are not limited to, degree of congestion, degree of confinement, gas cloud size gas concentration, gas type (reactivity), ignition location, active mitigation measures, and the like. The risk of vapor cloud explosion may be lowered by addressing any one (e.g., gas type reactivity) or several of the parameters. Conventional refrigerants used during LNG process such as methane have relatively low reactivity while other conventional refrigerants have high reactivity (e.g., ethylene) or medium reactivity (e.g., propane). Fuels are typically considered low reactivity if their laminar burning velocities (LBVs) are lower than about 40 cm/s. Medium reactivity fuels typically have LBVs between about 40 to about 75 cm/s. High reactivity fuels have LBVs of greater than about 75 cm/s. In general, reactivity increases as LBV increases. Thus, lowering the reactivity of refrigerants used during LNG processes can lower the risk of vapor cloud explosion and the overall safety risk basis arising from LNG facilities and related activities.

At least some conventional LNG refrigerants are considered greenhouse gases. These refrigerants can have certain environmental effects as measured by global-warming potential (GWP) and/or ozone depletion potential (ODP). GWP is a relative measure of how much heat a greenhouse gas traps in atmosphere using carbon dioxide as the standard. According to at least one study, the GWP of methane is about 72 over 20 years, about 25 over 100 years and about 7.6 over 500 years. ODP is a measure of the relative amount of degradation to the ozone layer that a particular compound can cause. For example, chlorofluorocarbons typically have an ODP about 1. To date the use of low combustibility environmentally-friendly refrigerants, particularly in certain LNG processes (e.g., cascade LNG processes, floating LNG facilities, etc.) have been non-existent or limited.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

The present invention provides compositions and methods related to reducing greenhouse materials from LNG processes and/or lowering safety risks associated with LNG facilities and associated activities. Some embodiments provide an environmentally-friendly refrigerant that is compatible with LNG processes. An environmentally-friendly refrigerant may be a composition having low global-warming potential and/or low ozone depletion potential. In certain embodiments, an environmentally-friendly refrigerant may be characterized by low combustibility.

The refrigerants according to one or more embodiments of the present invention may be used in place of conventional LNG refrigerants (e.g., propane, ethylene, etc.) or may be used in conjunction with conventional LNG refrigerants to form a refrigerant mixture. In some embodiments, the environmentally-friendly low combustibility refrigerant may be used in place of R-410A which is a 1:1 mixture of difluoromethane and pentafluoromethane. In other embodiments, the environmentally-friendly low combustibility refrigerant, such as Xenon or any mixture of Xenon and a fluorocarbon or hydrocarbon refrigerant with iodine (several embodiments of this idea exist either by using Xenon as a pure refrigerant or mixing Xenon with various hydrocarbon, fluorocarbon, iodine substituted fluorohydrocarbons, or fluorolefin refrigerant mixtures) may be used in place of ethylene. R-410A is sometimes used to pre-cool refrigerants during an LNG process and ethylene is used to condense LNG.

As compared to many conventional methods, advantages of certain embodiments of liquefying natural gas methods and systems described herein include, but are not limited to, one or more of the following:
- reduced emission of greenhouse gases
- lower safety risks of significant fires and explosions,
- elimination of certain safety equipments,
- significant reduction in capital expenditure.

Other advantages will be apparent from the disclosure herein.

Propane Pre-Cooled Refrigerant Process

LNG processes can comprise one or more refrigerants used during one or more cooling cycles. In at least one example, a pre-cooling cycle can be used to cool a mixed refrigerant. Subsequent liquefaction and sub-cooling cycles can use the mixed refrigerant which is typically made up of nitrogen, methane, ethane and propane. The pre-cooling cycle typically uses pure component propane at three or four pressure levels and can cool the process gas down to about −40° C. The propane may then be used to cool and partially liquefy the mixed refrigerant. A centrifugal compressor with side streams may be used to recover the evaporated C3 streams and compresses the vapor to 15-25 bar to be condensed against water or air and recycled to the propane kettles. In the mixed refrigerant cycle, the partially liquefied refrigerant is separated into vapor and liquid streams. The refrigerant may be used to liquefy and sub-cool the process stream from typically −35° C. to the temperature range of −150° C. to −160° C. in a cryogenic heat exchanger. The overall vaporized mixed refrigerant stream from the bottom of the cryogenic heat exchanger is recovered and compressed by a mixed refrigerant compressor to about 45-48 bara.

Optimized Cascade Process

In another LNG process, a first refrigerant may be used to cool a first refrigeration cycle. A second refrigerant may be used to cool a second refrigeration cycle. A third refrigerant may be used to cool a third refrigeration cycle. As used herein, the terms "first", "second", and "third" refer to the relative position of the refrigeration cycles with respect to each other. For example, the first refrigeration cycle is positioned upstream of the second refrigeration cycle while the second refrigeration cycle is positioned upstream of the third refrigeration cycle and so forth. An optimized cascade LNG process typically utilizes propane, ethylene, and methane as the first, second, and third refrigerant respectively.

Figure 2:
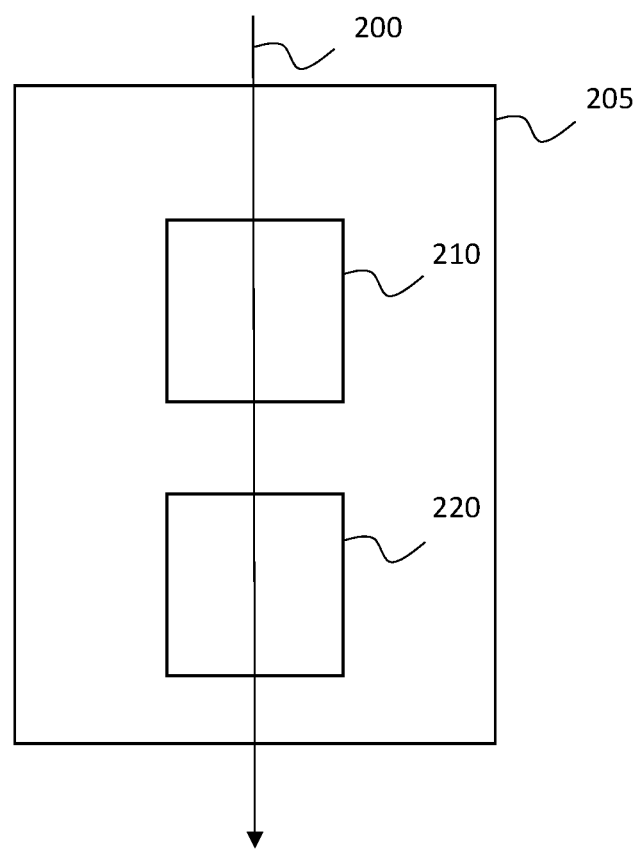
FIG. 2 is a diagram of an LNG facility with two refrigeration cycles.

The present invention can be implemented in a process/facility (205 in FIG. 2) used to cool natural gas (200 in FIG. 2) to its liquefaction temperature, thereby producing LNG. The LNG process generally employs one or more refrigerants to extract heat from the natural gas and then reject the heat to the environment. In one embodiment, the LNG process employs a cascade-type refrigeration process that uses a plurality of multi-stage cooling cycles, each employing a different refrigerant composition, to sequentially cool the natural gas stream to lower and lower temperatures. In another embodiment, the LNG process is a mixed refrigerant process that employs a combination of two or more refrigerants to cool the natural gas stream in at least one cooling cycle.

Natural gas can be delivered to the LNG process at an elevated pressure in the range of from about 500 to about 3,000 pounds per square in absolute (psia), about 500 to about 1,000 psia, or 600 to 800 psia. Depending largely upon the ambient temperature, the temperature of the natural gas delivered to the LNG process can generally be in the range of from about 0 to about 180° F. (about −18 to about 82° C.), or about 20 to about 150° F. (about −7 to about 66° C.), or 60 to 125° F. (about 16 to about 52° C.

While references to a specific cascade LNG process having, for example, 3 separate refrigerants in 3 separate refrigeration cycles are made, this is not intended to be limiting. It is recognized that a cascade LNG process involving more or less refrigerants and/or refrigeration cycles may be contemplated. Other variations to the cascade LNG process may also be contemplated.

In one embodiment, the present invention can be implemented in an LNG process that employs cascade-type cooling followed by expansion-type cooling. In such a liquefaction process, the cascade-type cooling may be carried out in a mechanical refrigeration cycle at an elevated pressure (e.g., about 650 psia) by sequentially passing the natural gas stream through first, second, and third refrigeration cycles employing respective first, second, and third refrigerants. In one embodiment, the first and second refrigeration cycles are closed refrigeration cycles, while the third refrigeration cycle is an open refrigeration cycle that utilizes a portion of the processed natural gas as a source of the refrigerant. Further, the third refrigeration cycle can include a multistage expansion cycle to provide additional cooling of the processed natural gas stream and reduce its pressure to near atmospheric pressure.

In the sequence of first (210 in FIG. 2), second (220 in FIG. 2), and third refrigeration cycles, the refrigerant having the highest boiling point can be utilized first, followed by a refrigerant having an intermediate boiling point, and finally by a refrigerant having the lowest boiling point. In one embodiment, the refrigerant can be a hydrocarbon-containing refrigerant. In another embodiment, the first refrigerant has a mid-boiling point at standard temperature and pressure (i.e., an STP mid-boiling point) within about 20, about 10, or 5° F. of the STP boiling point of pure propane. The first refrigerant can contain predominately propane, propylene, or mixtures thereof. The first refrigerant can contain at least about 75 mole percent propane, at least 90 mole percent propane, or can consist essentially of propane. In one embodiment, the second refrigerant has an STP mid-boiling point within about 20, about 10, or 5° F. of the STP boiling point of pure ethylene. The second refrigerant can contain predominately ethane, ethylene, or mixtures thereof. The second refrigerant can contain at least about 75 mole percent ethylene, at least 90 mole percent ethylene, or can consist essentially of ethylene. In one embodiment, the third refrigerant has an STP mid-boiling point within about 20, about 10, or 5° F. of the STP boiling point of pure methane. The third refrigerant can contain at least about 50 mole percent methane, at least about 75 mole percent methane, at least 90 mole percent methane, or can consist essentially of methane. At least about 50, about 75, or 95 mole percent of the third refrigerant can originate from the processed natural gas stream.

The first refrigeration cycle can cool the natural gas in a plurality of cooling stages/steps (e.g., two to four cooling stages) by indirect heat exchange with the first refrigerant. Each indirect cooling stage of the refrigeration cycles can be carried out in a separate heat exchanger. In the one embodiment, core-and-kettle heat exchangers are employed to facilitate indirect heat exchange in the first refrigeration cycle. After being cooled in the first refrigeration cycle, the temperature of the natural gas can be in the range of from about −45 to about −10° F. (about −43 to about −23° C.), or about −40 to about −15° F. (about −40 to about −26° C.), or about −20 to −30° F. (−29 to about −34° C.). A typical decrease in the natural gas temperature across the first refrigeration cycle may be in the range of from about 50 to about 210° F. (about 10 to about 99° C.), about 75 to about 180° F. (about 24 to about 82° C.), or about 100 to about 140° F. (about 38 to about 60° C.).

The second refrigeration cycle can cool the natural gas in a plurality of cooling stages/steps (e.g., two to four cooling stages) by indirect heat exchange with the second refrigerant. In one embodiment, the indirect heat exchange cooling stages in the second refrigeration cycle can employ separate, core-and-kettle heat exchangers. Generally, the temperature drop across the second refrigeration cycle can be in the range of from about 50 to about 180° F. (about 10 to about 82° C.), about 75 to about 150° F. (about 24 to about 66° C.), or about 100 to about 120° F. (about 38 to about 49° C.). In the final stage of the second refrigeration cycle, the processed natural gas stream can be condensed (i.e., liquefied) in major portion, preferably in its entirety, thereby producing a pressurized LNG-bearing stream. Generally, the process pressure at this location is only slightly lower than the pressure of the natural gas fed to the first stage of the first refrigeration cycle. After being cooled in the second refrigeration cycle, the temperature of the natural gas may be in the range of from about −205 to about −70° F. (about −132 to about −57° C.), about −175 to about −95° F. (about −115 to about −71° C.), or about −140 to about −125° F. (about −96 to about −87° C.).

The third refrigeration cycle can include both an indirect cooling section and an expansion-type cooling section. To facilitate indirect heat exchange, the third refrigeration cycle can employ at least one brazed-aluminum plate-fin heat exchanger. The total amount of cooling provided by indirect heat exchange in the third refrigeration cycle can be in the range of from about 5 to about 60° F., about 7 to about 50° F., or 10 to 40° F.

The expansion-type cooling section of the third refrigeration cycle can further cool the pressurized LNG-bearing stream via sequential pressure reduction to approximately atmospheric pressure. Such expansion-type cooling can be accomplished by flashing the LNG-bearing stream to thereby produce a two-phase vapor-liquid stream. When the third refrigeration cycle is an open refrigeration cycle, the expanded two-phase stream can be subjected to vapor-liquid separation and at least a portion of the separated vapor phase (i.e., the flash gas) can be employed as the third refrigerant to help cool the processed natural gas stream. The expansion of the pressurized LNG-bearing stream to near atmospheric pressure can be accomplished by using a plurality of expansion steps (i.e., two to four expansion steps) where each expansion step is carried out using an expander. Suitable expanders include, for example, either Joule-Thomson expansion valves or hydraulic expanders. In one embodiment, the third stage refrigeration cycle can employ three sequential expansion cooling steps, wherein each expansion step can be followed by a separation of the gas-liquid product. Each expansion-type cooling step can further cool the LNG-bearing stream in the range of from about 10 to about 60° F., about 15 to about 50° F., or 25 to 35° F. The reduction in pressure across the first expansion step can be in the range of from about 80 to about 300 psia, about 130 to about 250 psia, or 175 to 195 psia. The pressure drop across the second expansion step can be in the range of from about 20 to about 110 psia, about 40 to about 90 psia, or 55 to 70 psia. The third expansion step can further reduce the pressure of the LNG-bearing stream by an amount in the range of from about 5 to about 50 psia, about 10 to about 40 psia, or 15 to 30 psia. The liquid fraction resulting from the final expansion stage is an LNG product. Generally, the temperature of the LNG product can be in the range of from about −200 to about −300° F. (−129 to about −184° C.), about −225 to about −275° F. (about −143 to about −170° C.), or about −240 to about −260° F. (about −151 to about −162° C.). The pressure of the LNG product can be in the range of from about 0 to about 40 psia, about 10 to about 20 psia, or 12.5 to 17.5 psia.

The natural gas feed stream to the LNG process will usually contain such quantities of C2+ components so as to result in the formation of a C2+ rich liquid in one or more of the cooling stages of the second refrigeration cycle. Generally, the sequential cooling of the natural gas in each cooling stage is controlled so as to remove as much of the C2 and higher molecular weight hydrocarbons as possible from the gas, thereby producing a vapor stream predominating in methane and a liquid stream containing significant amounts of ethane and heavier components. This liquid can be further processed via gas-liquid separators employed at strategic locations downstream of the cooling stages. In one embodiment, one objective of the gas/liquid separators is to maximize the rejection of the C5+ material to avoid freezing in downstream processing equipment. The gas/liquid separators may also be utilized to vary the amount of C2 through C4 components that remain in the natural gas product to affect certain characteristics of the finished LNG product.

The exact configuration and operation of gas-liquid separators may be dependant on a number of parameters, such as the C2+ composition of the natural gas feed stream, the desired BTU content of the LNG product, the value of the C2+ components for other applications, and other factors routinely considered by those skilled in the art of LNG plant and gas plant operation. In one embodiment of the present invention, the C2+ hydrocarbon stream or streams may be demethanized via a single stage flash or a fractionation column. The gaseous methane-rich stream can be directly returned at pressure to the liquefaction process. The resulting heavies-rich liquid stream may then be subjected to fractionation in one or more fractionation zones to produce individual streams rich in specific chemical constituents (e.g., $C_2$, $C_3$, $C_4$, and $C_5$+).

The environmentally-friendly low combustibility refrigerants of the present invention may be used during liquefaction of natural gas. Refrigerants utilized in cascade-type refrigeration processes can have successively lower boiling points in order to maximize heat removal from the natural gas stream being liquefied. Additionally, cascade-type refrigeration processes can include some level of heat integration. For example, a cascade-type refrigeration process can cool one or more refrigerants having a higher volatility via indirect heat exchange with one or more refrigerants having a lower volatility. In addition to cooling the natural gas stream via indirect heat exchange with one or more refrigerants, cascade and mixed-refrigerant LNG systems can employ one or more expansion cooling stages to simultaneously cool the LNG while reducing its pressure to near atmospheric pressure. In some embodiments, the environmentally-friendly low combustibility refrigerant may be used in a floating LNG (FLNG) process. In one or more embodiments, the environmentally-friendly low combustibility refrigerant may be used in an optimized cascade LNG process.

Refrigerants

A refrigerant is a substance used in a heat cycle, which can undergo a reversible phase transition from a liquid to a gas during an LNG process. Depending on the application, a novel or replacement refrigerant may be difficult to implement. Potential refrigerant candidates may offer certain benefits but may have limited ranges of efficient application. The environmentally-friendly low combustibility refrigerant according to one or more embodiments may be used as a refrigerant to cool a fluid via indirect heat exchange during an LNG process.

In some embodiments, the environmentally-friendly low combustibility refrigerant comprises a fluorinated olefin or a derivative thereof. Suitable examples of fluorinated olefin include, but are not limited to, difluoroethylene (including difluoro-1,1-ethylene), tetrafluoropropene (including 2,3,3,3-tetrafluoropropene), hexafluoropropene and tetrafluoroethene. Other examples of fluorinated olefin may include, but are not limited to, pentafluoropropene, pentafluoroethene, tetrafluorobutane, pentafluorobutane, hexafluorobutane, and the like. In some embodiments, the fluorinated olefin may comprise one or more carbons. In those embodiments, the fluorohydrocarbon may comprise between one carbon to about ten carbons. In some embodiments, the fluorinated olefin may comprise one or more fluorines. In some embodiments, the fluorinated olefin may be present in about 0.1% to about 99% by volume of the environmentally-friendly low combustibility refrigerant.

The environmentally-friendly low combustibility refrigerant may also include at least one of: nitrogen, methane, ethane, and propane. In certain embodiments, the environmentally-friendly low combustibility refrigerant may be a pure substance, a substantially pure substance, or a refrigerant mixture comprising several substances. In the latter case, the refrigerant mixture may comprise a fluorinated olefin or a derivative thereof and a paraffinic fluorocarbon or a derivative thereof. Suitable examples of paraffinic fluorocarbons include, but are not limited to, difluoromethane, pentafluoromethane, trifluoromethane, hexafluoroethane, derivatives thereof, and combinations thereof. Other suitable paraffinic fluorocarbons may include, but are not limited to, difluoropropane, trifluoropropane, tetrafluoropropane, pentafluoropropane, and the like. The hydrocarbon portion of the paraffinic fluorocarbon may comprise one or more carbons. In some embodiments, the paraffinic fluorocarbon may comprise between one carbon to about ten carbons. In those embodiments, the paraffinic fluorocarbon may comprise one or more fluorines.

In some embodiments, the environmentally-friendly low combustibility refrigerant may be an azeotropic or near-azeotropic mixture. In other embodiments, the environmentally-friendly low combustibility refrigerant may be a zeotropic mixture. In some embodiments, the environmentally-friendly low combustibility refrigerant is substantially free of hydrocarbons. In other embodiments, the environmentally-friendly low combustibility refrigerant includes a hydrocarbon component in an amount ranging from about 0.1% to about 99% by volume. In such embodiments, the hydrocarbon may be selected from the group consisting of: ethylene, propane, methane, and any combination thereof.

The following examples of certain embodiments of the invention are given. Each example is provided by way of explanation of the invention, one of many embodiments of the invention, and the following examples should not be read to limit, or define, the scope of the invention.

Example 1

In this Example, laminar burning velocities for various compounds were measured. The tests were performed using a constant-volume vessel in which gases were introduced using a partial pressure method, allowed to mix, and ignited. The resulting dynamic pressure trace was analyzed in order to calculate the LBV.

The measured LBV values are summarized in Table 1 below. The reactivity of a compound increases as LBV increases. This reactivity is typically a function of the strength of hydrogen bonding in the compound and not the heat of combustion or the thermal unit (e.g., BTU) value.

TABLE 1

| Compound | LBV (m/s) |
|---|---|
| Methane | ~0.40 |
| Propane | ~0.46 |
| Ethylene | ~0.75 |
| Acetylene | ~1.55 |
| Hydrogen | ~3.25 |

FIG. 1 illustrates the results of an experiment in which various nonflammable refrigerants and compounds such as hydrofluoro-olefin (HFO1234yf), R-410A, and $CO_2$ were added to propane. As the nonflammable refrigerant fraction increases, the laminar burning velocity decreases. The equivalence ratio, phi, is defined as the ratio of the stoichiometric oxideizer to fuel ratio over the actual oxidizer to fuel ratio.

Definitions

As used herein, "confinement" and related terms refer to the presence of obstructions that prevent flame propagation in any one of three directions (x, y, or z directions). Objects may be confined in one dimension, two dimensions, or three dimensions.

As used herein, "congestion" and related terms refer to the presence of obstacles that cause a flame front to flow around the obstacles thus generating turbulence and accelerating the flame front. More specifically, the terms "low congestion", "medium congestion", and "high congestion" may be a context dependent term. For example, "low congestion" may be defined as having about 15% or less area blockage ratio (ABR) and a pitch of greater than about 8D. In some embodiments, "low congestion" may refer to an area that is easy to walk through relatively unimpeded. The term "medium congestion" may refer to an area having between about 15% to about 30% ABR and a pitch of about 4D to about 8D. In some embodiments, "medium congestion" may refer to an area that can be walked through but requires taking an indirect path. The term "high congestion" may refer to an area having more than about 30% ABR and a pitch of less than about 4D. In some embodiments, "high congestion" may refer to an area that cannot be walked through.

As used herein, the term "area blockage ratio" refers to the ratio of the volume of congestion to the total volume available.

As used herein, the term "pitch" refers to the distance between rows of repeated congestion obstacles. Pitch is oftentimes measured as a multiple of the average congestion diameter (i.e., 8D=8 diameter lengths).

As used herein, the term "risk" refers to the probability and the consequence of an accidental event.

As used herein, the term "fuel reactivity" refers to the propensity of a flame to accelerate in the presence of turbulence generators.

As used herein, the term "derivative" refers to a compound that is derived from a similar compound.

As used herein, the term "combustibility" refers to laminar burning velocity. As used herein, the term "environmentally-friendly" refers to lower potential environmental impact of a given material. As used herein, the term "greenhouse warming potential" refers to the relative impact estimated against the impact of carbon dioxide. As used herein, the term "ozone depletion potential" refers to refers to the amount of ozone depletion caused by a substance. The ODP is the ratio of the impact on ozone of a chemical compared to the impact of a similar mass of CFC-11. Thus, the ODP of CFC-11 is defined to be 1.0.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. U.S. Pat. No. 7,849,691
2. US 20100122551
3. US 20100281915

The invention claimed is:

1. A method for liquefying natural gas offshore to produce liquified natural gas (LNG), said method comprising:
   a) cooling a natural gas stream in an offshore LNG facility via indirect heat exchange in a first refrigeration cycle with a first azeotropic mixture of 75-90 mole percent propane and an environmentally-friendly low combustibility refrigerant comprising 10-25 mole percent fluorinated olefin, wherein the laminar burning velocity (LBV) of said first mixture is about 40 cm/s and decreases the risk of vapor cloud explosion as compared to mixtures having LBV>40 cm/s; and then
   b) further cooling the natural gas stream via indirect heat exchange in a second refrigeration cycle with a second azeotropic mixture of the fluorinated olefin and ethylene; and then
   c) further cooling the natural gas stream in an open refrigeration cycle with 75-100 mole percent methane; and
   d) producing LNG.

2. The method of claim 1, wherein the fluorinated olefin includes 2 to about 10 carbons.

3. The method of claim 1, wherein the fluorinated olefin is 1234yf.

4. The method of claim 1, wherein the environmentally-friendly low combustibility refrigerant is used in an optimized cascade process.

5. The method of claim 1, further comprising: vaporizing the liquefied natural gas.

6. A method for liquefying natural gas offshore to produce liquified natural gas (LNG), said method comprising:
   a) cooling a natural gas stream via indirect heat exchange in a first refrigeration cycle with a first azeotropic mixture of 75-90 mole percent propane and 10-25 mole percent of a fluorinated olefin, wherein the laminar burning velocity of said first mixture is 40 cm/s and decreases the risk of vapor cloud explosion as compared to mixtures having LBV>40 cm/s;
   b) further cooling the natural gas stream via indirect heat exchange in a second refrigeration cycle with a second azeotropic mixture of ethylene and said fluorinated olefin,
   c) further cooling the natural gas stream via a third open refrigeration cycle with 75-100 mole percent methane; and
   d) producing LNG.

7. A method for liquefying natural gas to produce LNG, comprising:
   a) cooling a natural gas stream in an offshore LNG facility via indirect heat exchange in a first refrigeration cycle with a first azeotropic mixture of 75-90% of propane by volume and an environmentally-friendly low combustibility refrigerant comprising 10-25% fluorinated olefin by volume, wherein the laminar burning velocity of said first mixture is less than 40 cm/s and decreases the risk of vapor cloud explosion as compared to mixtures having LBV greater than 40 cm/s; and then
   b) further cooling the natural gas stream via indirect heat exchange in a second refrigeration cycle with a second azeotropic mixture of the fluorinated olefin and ethylene; and then
   c) further cooling the natural gas stream via a third open refrigeration cycle with 75-100 mole percent methane, wherein 50 mole percent of said methane originates from processed natural gas produced in said method; and
   d) producing LNG.

8. The method of claim 7, wherein the fluorinated olefin is 2,3,3,3-tetrafluoropropene.

9. A method for liquefying natural gas in an offshore facility to produce liquified natural gas (LNG), said method comprising:
   a) cooling a natural gas stream in an offshore LNG facility via indirect heat exchange in a first refrigeration cycle with a first azeotropic mixture of 85 mole percent propane and an 15 mole percent 1234yf, wherein the laminar burning velocity (LBV) of said first azeotropic mixture is about 40 cm/s and decreases the risk of vapor cloud explosion as compared to mixtures of greater than 40 cm/s; and then
   b) further cooling the natural gas stream via indirect heat exchange in a second refrigeration cycle with a second azeotropic mixture of 1234yf and ethylene; and then
   c) further cooling the natural gas stream in an open refrigeration cycle with 75-100 mole percent methane, wherein about 50 mole percent of said methane originates from LNG produced in step d in said method; and
   d) producing LNG.

* * * * *